United States Patent [19]

Taylor

[11] Patent Number: 4,588,906

[45] Date of Patent: May 13, 1986

[54] REGULATOR CIRCUIT

[75] Inventor: Gerald G. Taylor, Grass Valley, Calif.

[73] Assignee: The Grass Valley Group, Inc., Grass Valley, Calif.

[21] Appl. No.: 603,541

[22] Filed: Apr. 25, 1984

[51] Int. Cl.⁴ .................................... H03K 3/16
[52] U.S. Cl. ............................ 307/270; 307/297; 307/315
[58] Field of Search .................... 307/270, 315, 297

[56] References Cited

U.S. PATENT DOCUMENTS

| | | | |
|---|---|---|---|
| 3,597,635 | 8/1971 | Reich | 307/270 |
| 3,805,094 | 4/1974 | Orlando | 307/270 |
| 3,809,998 | 5/1974 | Mansson | 307/270 |
| 4,093,877 | 6/1978 | Pollmeier | 307/270 |
| 4,109,167 | 8/1978 | Kaji et al. | 307/315 |
| 4,414,479 | 11/1983 | Foley | 307/315 |

*Primary Examiner*—John S. Heyman
*Attorney, Agent, or Firm*—John P. Dellett; Francis I. Gray

[57] ABSTRACT

A buck regulator circuit including an inductance is provided with an input current via a pass transistor and a second transistor disposed in drive relation to the pass transistor. The second transistor supplies current to the inductance at a tapped connection so the second transistor may drive the first transistor at a voltage level sufficiently high for saturating the first transistor.

10 Claims, 1 Drawing Figure

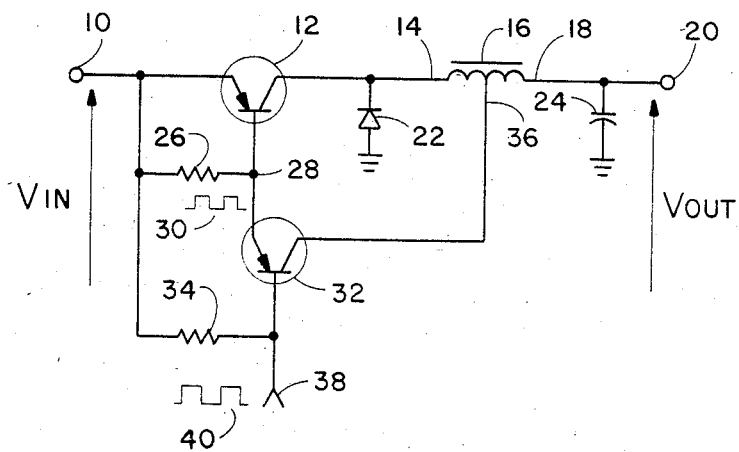

REGULATOR CIRCUIT

BACKGROUND OF THE INVENTION

The present invention relates to buck regulator circuits and particularly to such a regulator circuit exhibiting enhanced efficiency of operation.

In buck regulator circuits a current is supplied from a first source to a current sustaining inductance through a first switching means on a duty cycle basis for controlling an output voltage level. Second switching means, alternatively operable with the first switching means, completes a current path through the inductance when the first switching means is turned off.

In the conventional buck regulator circuit, the first switching means comprises a series pass translator. It is usually necessary to provide a substantial amount of base drive to this pass transistor, e.g. via a drive transistor, and in order that current from the drive transistor may ultimately add to the output, some form of Darlington circuit configuration is frequently used. However, the Darlington configuration prevents the pass transistor from saturating and therefore introduces an additional voltage drop across the pass transistor which translates into a considerable power loss when the output current is on the order of amps.

SUMMARY OF THE INVENTION

In accordance with the present invention, in a preferred embodiment thereof, an inductance in a regulator circuit is provided with switching means for supplying input current, this switching means comprising first control means in circuit with the inductance and second control means for driving the first control means. The second control means also supplies current to the inductance and is coupled to supply such current at a higher voltage level for driving the first control means to a high level of conduction.

In a particular embodiment, the first and second control means comprise transistors wherein the first or pass transistor is driven at its base by the emitter of the second or drive transistor. Both transistors supply their collector currents to the inductance of the regulator circuit, but the collector of the second transistor is tapped up on the inductance so that it operates at a higher voltage level when the transistors conduct. As a consequence, the second or drive transistor is able to drive the first or pass transistor into saturation for increasing circuit efficiency.

It is therefore an object of the present invention to provide an improved buck regulator circuit which exhibits enhanced efficiency as compared with prior art circuits.

It is another object of the present invention to provide an improved regulator circuit wherein control devices for operating an inductance on a duty cycle basis provide current to said inductance without producing a substantial voltage drop across the pass control device.

The subject matter of the present invention is particularly pointed out and distinctly claimed in the concluding portion of this specification. However, both the organization and method of operation, together with further advantages and objects thereof, may best be understood by reference to the following description taken in connection with accompanying drawing.

DRAWING

The FIGURE on the single sheet of drawings is a schematic diagram of a regulator circuit according to the present invention.

DETAILED DESCRIPTION

An input terminal 10 connected to a source of input voltage $V_{in}$ is coupled to the emitter of a pass transistor 12 forming a first switching means, and in particular a first control device thereof. The collector of transistor 12 is coupled to first connection 14 of inductance 16 having a second terminal connection 18 coupled to output terminal 20.

A unilateral conductor or diode 22, providing a second switching means, is interposed between connection 14 and a point of common reference potential or ground, the said diode being poled to conduct current from inductance 16 in a direction opposite to current flow in the collector-emitter path of transistor 12. Thus, in the circuit embodiment illustrated, transistor 12 is a PNP type having its collector connected to connection 14, to which the cathode of diode 22 is also connected. Furthermore, a capacitor 24 is interposed between connection 18 and a source of reference potential or ground. It will be noted that both $V_{in}$ at terminal 10 and $V_{out}$ at terminal 20 are taken with respect to such point of reference potential or ground. A base resistor 26 is also interposed between the base of transistor 12 and the input terminal 10.

The circuit as thus far described comprises a type of buck regulator or converter for receiving a first DC voltage at terminal 10 with respect to ground, and for providing a second voltage at output 20 with respect to ground. The magnitude of the voltage $V_{out}$ at terminal 20 is responsive to the drive signal applied at base terminal 28 of transistor 12 wherein the latter signal suitably comprises a "square" wave 30 for turning transistor 12 off and on on a duty cycle basis. When transistor 12 is conducting, a current flows therethrough from terminal 10 and through inductance 16 in charging relation to capacitor 24 establishing the output voltage, $V_{out}$, across capacitor 24. When transistor 12 ceases conducting, the field of inductance 16 produces a continued current flow in charge relation to capacitor 24 through diode 22 rather than transistor 12. The value of the voltage $V_{out}$ is determined by the duty cycle of input waveform 30.

It is usually necessary to provide a substantial amount of base drive to transistor 12, and consequently a second or drive transistor 32 is provided, the latter comprising second control means according to the present invention. The emitter of transistor 32 is connected to the base terminal 28 of the transistor 12, while the base of transistor 32 is returned to terminal 10 by way of base resistor 34. The collector of the transistor 32 is coupled in current supplying relation to inductance 16 via tapped connection 36 as hereinafter more fully discussed. The base of transistor 32 is connected to drive input terminal 58 for receiving the control input "square" wave 40 enabling the emitter of transistor 32 to provide the aforementioned "square" wave 30 at base terminal 28 of pass transistor 12. Drive input terminal 38 is connected to conventional control circuitry, not shown.

Transistors 12 and 32 are interconnected in a manner somewhat similar to a Darlington configuration except that the collectors of the two transistors are not connected together. If they were connected together, in the manner of some prior art circuits, certain problems would arise. Under such conditions when a negative going drive pulse is presented at terminal 38, with the intention of turning both transistors 32 and 12 on, a voltage drop of about 0.7 volts will occur across the emitter-base junction of transistor 12, and another 0.7 volt drop will occur across the emitter-pase junction of transistor 32. As transistor 12 conducts to supply current to inductance 16, the voltage between the collector and emitter of transistor 12 will decrease to about 0.9 volts. Assuming, as indicated, that the collectors of transistors 12 and 32 are connected together, the collector of transistor 32 will be at a voltage closer to the voltage at terminal 10 than will its base, since, as previously mentioned, a 0.7 volt drop exists across the emitter-base junction of transistor 12 and another 0.7 volt drop is present across the emitter-base junction of transistor 32. Inasmuch as the collector voltage of transistor 32 is "less than" its base voltage, the current to resistor 26 will not increase as desired to produce a voltage at terminal 28 for driving transistor 12 into saturation. The excessive voltage drop across transistor 12 represents considerable power dissipation when a current on the order of amps is flowing through this transistor.

One solution to the problem would simply be to connect the collector of transistor 32 to some higher voltage point. However, because the beta of a pass transistor such as transistor 12 isn't terribly high, the drive transistor 32 draws significant current, and if the collector of drive transistor 32 is merely connected to an arbitrarily higher voltage, then current through transistor 32 is dissipated elsewhere than through the load. This is also undesirable from the efficiency standpoint. The prior Darlington type circuit caused both transistors to contribute to load current, however.

In the circuit according to the present invention, the collector of transistor 32 is coupled to a tapped connection 36 on inductance 16. In a specific example, the tapped connection 36 is positioned above connection 14 to provide a voltage difference of approximately one volt between connections 36 and 14 at a time when $V_{in}$ is at its minimum expected value. In particular, the number of turns between connections 14 and 36, $n_1 = N/(V_{in, min} - V_{out})$, where N is equal to the total number of turns on the inductance. It will be seen the tapped connection 36 provides means for enabling transistor 32 to supply current to the load via the inductance while also establishing a "higher" voltage level at the collector of transistor 32 whereby transistor 32 can drive transistor 12 into saturation. Thus, with the collector voltage of transistor 32 not limited to the collector voltage of transistor 12, increased current can be passed through resistor 26 to produce a voltage at base terminal 28 for driving transistor 12 completely into saturation. Inasmuch as the voltage across transistor 12 at saturation is considerably reduced, e.g. to a voltage on the order of two or three hundred millivolts, the power dissipation is also reduced and the efficiency of the circuit is improved. Although some delay will be introduced into the control loop equal to the saturation time of transistor 12, there will be little effect on the fall time of transistor 12. Hence, the dynamic efficiency will be unaffected.

Although it is indicated in the present specification and claims that tapping the collector of transistor 32 "up" on inductance 16 provides a "higher" voltage level for transistor 32 than transistor 12, it will be appreciated this may mean the voltage at tapped connection 36 is more negative than the voltage at connection 14, as in the present example, or more positive if, for example, transistors of a reversed polarity type were to be employed. In any case, the voltage difference between the collector of transistor 32 and terminal 10 is greater than the voltage difference between the collector of transistor 12 and terminal 10 for enabling saturation of transistor 12, while both transistors 12 and 32 supply current that ultimately adds to the output.

Although the means for coupling the collector of the drive transistor to the inductance so that such drive transistor supplies current to the inductance at a higher voltage level preferably comprises a tap on the inductance, it will be appreciated that other means may be employed, for example an additional winding may be provided for this purpose on the inductance core.

While a preferred embodiment of the present invention has been shown and described, it will be apparent to those skilled in the art that many other changes and modifications may be made without departing from the invention in its broader aspects. The appended claims are therefore intended to cover all such changes and modifications as fall within the true spirit and scope of the invention.

I claim:

1. A regulator for converting a first voltage value to a second voltage value, comprising:
    an inductance for carrying a current in said regulator and having an output terminal from which said second voltage value is obtained, said inductance having a tapped connection, and
    switching means having said first voltage value as an input for supplying an input current to an input terminal of said inductance, said switching means comprising first control means in a circuit with said inductance for providing current thereto and second control means in circuit with said tapped connection for supplying current thereto while also driving said first control means in response to a duty cycle drive signal.

2. A regulator circuit for converting a first voltage value to a second voltage value, comprising:
    an inductance for carrying a current in said regulator circuit and having an output terminal from which said second voltage value is obtained,
    first switching means having said first voltage value as an input for supplying current through an input terminal of said inductance on a duty cycle basis, and
    second switching means alternately operable with said first switching means whereby said inductance is adapted to supply current to a load,
    said second switching means including drive means for said first switching means for producing a high level of conduction in said first switching means while providing additional current to said inductance on a duty cycle basis.

3. A regulator circuit for converting a first voltage to a second voltage, comprising:
    an inductance for carrying a current in said regulator circuit and having an output terminal from which said second voltage is obtained, a first control device having said first voltage as an input for providing an input current to as input terminal of said inductance on a duty cycle basis,
    a second control device for driving the first control device on said duty cycle basis, and means for also coupling input current from said second control device to said inductance on a duty cycle basis and at a higher voltage level during conduction than said first control device to enable the second control device to drive the first control device to a high level of conduction.

4. The regulator circuit according to claim 3 wherein said means for also coupling input current from said second control device to said inductance comprises a tap on said inductance.

5. A regulator for converting a first voltage value to a second voltage value, comprising:
   an inductance for sustaining a current within said regulator, said inductance having a first connection, a second connection from which said second voltage value is obtained, and a tapped connection,
   and switching means in circuit with said inductance for periodically energizing the same, said switching means including pass control means having said first voltage value as an input for providing current via its principal current carrying path to said first connection of said inductance, and second control means disposed in input drive relation to said pass control means while also providing current via its principal current carrying path to said tapped connection of said inductance whereby to establish a voltage level in said second control means enabling it to drive said pass control means to a high level of conduction.

6. The regulator according to claim 5 wherein said pass control means comprises a first transistor having its collector-emitter path disposed in series relation with said first connection of said inductance, and wherein said second control means comprises a second transistor with its emitter connected in driving relation to the base of the first transistor, the collector-emitter path of said second transistor being disposed in series relation with said tapped connection of said inductance.

7. The regulator according to claim 6 further including a capacitor returning the second connection of said inductance to a point of reference potential and a unilateral conductor also returning the first connection of said inductance to said point of reference potential.

8. A regulator circuit for converting a first voltage value at an input terminal to a second voltage value at an output terminal comprising:
   an inductance for sustaining a current within said regulator circuit, said inductance having a first connection, a second connection, connected to said output terminal and a tapped connection,
   a first transistor having its emitter coupled to said input terminal, and having its collector coupled to said first connection of said inductance,
   a second transistor having its emitter coupled to the base of said first transistor, and having its collector coupled to said tapped connection of said inductance,
   means for coupling drive to the base of said second transistor for controlling the duty cycle of said regulator circuit,
   a unilateral conductor interposed between said first connection of said inductance and a point of common reference potential,
   and a capacitor interposed between said second connection of said inductance and a point of common reference potential.

9. The regulator circuit according to claim 8 wherein the tapped connection on said inductance is positioned to produce a voltage difference between said tapped connection and said first connection on the order of one volt.

10. An improved regulator circuit of the type having a first switch and an inductance in series between an input terminal and an output terminal, and a drive signal input to the first switch for operating the first switch on a duty cycle basis to cause current to flow therethrough, wherein the improvement comprises a second switch connected between the input terminal and a tap on the inductance, the second switch being configured to drive the first switch in response to the drive signal.

* * * * *